United States Patent
Kagoshima et al.

(10) Patent No.: US 11,453,411 B2
(45) Date of Patent: Sep. 27, 2022

(54) MOVING BODY OPERATION SUPPORT SYSTEM

(71) Applicant: Kabushiki Kaisha Toshiba, Tokyo (JP)

(72) Inventors: Takehiko Kagoshima, Yokohama Kanagawa (JP); Noriko Yamanaka, Kawasaki Kanagawa (JP); Tatsuma Ishihara, Kawasaki Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 994 days.

(21) Appl. No.: 15/908,062

(22) Filed: Feb. 28, 2018

(65) Prior Publication Data

US 2019/0061781 A1  Feb. 28, 2019

(30) Foreign Application Priority Data

Aug. 28, 2017  (JP) .............................. JP2017-163582

(51) Int. Cl.
  B60W 50/10  (2012.01)
  G10L 15/22  (2006.01)
  (Continued)

(52) U.S. Cl.
  CPC ............. B60W 50/10 (2013.01); G06F 3/167 (2013.01); G10L 15/22 (2013.01);
  (Continued)

(58) Field of Classification Search
  CPC ... G10L 15/22; G10L 2015/223; G10L 25/63; G10L 2015/227; G10L 17/22;
  (Continued)

(56) References Cited

U.S. PATENT DOCUMENTS 5,774,069 A     6/1998 Tanaka et al.
10,042,359 B1 * 8/2018 Konrardy ............... G05B 15/02
(Continued)

FOREIGN PATENT DOCUMENTS

JP    H 09-161196     6/1997
JP    2003-315082 A   11/2003
(Continued)

*Primary Examiner* — Jelani A Smith
*Assistant Examiner* — Paul A Castro
(74) *Attorney, Agent, or Firm* — Knobbe, Martens, Olson & Bear LLP

(57) ABSTRACT

According to one embodiment, a moving body operation support system includes an acquirer, a microphone, a transceiver, and a processor. The acquirer acquires moving body information relating to a state of a moving body. The microphone is provided in the moving body. The transceiver performs transmitting to and receiving from an operator communication device. The processor implements one of a first operation or a second operation based on the moving body information and instruction information. The instruction information relates to an instruction based on a sound acquired by the microphone. The instruction is of a user riding in the moving body. In the first operation, the processor causes the moving body to perform an operation corresponding to the instruction information. In the second operation, the processor enables communication between
(Continued)

the user and the operator by the transmitting and receiving between the transceiver and the operator communication device.

19 Claims, 3 Drawing Sheets

(51) Int. Cl.
*G06F 3/16* (2006.01)
*G10L 25/63* (2013.01)

(52) U.S. Cl.
CPC ..... *B60W 2520/10* (2013.01); *B60W 2540/21* (2020.02); *B60W 2540/22* (2013.01); *B60W 2556/50* (2020.02); *B60W 2556/65* (2020.02); *B60W 2900/00* (2013.01); *G10L 25/63* (2013.01); *G10L 2015/223* (2013.01)

(58) Field of Classification Search
CPC ... G10L 25/48; G06F 3/167; G06F 16/24575; G06F 2203/0381; G06F 3/16; G06F 16/683; G06F 1/3209; B60W 50/10; B60W 2556/50; B60W 2540/21; B60W 2556/65; B60W 2520/10; B60W 2540/22; B60W 2900/00; B60K 2370/148; B60K 2370/11; B60K 2370/146; B60K 2370/21; B60K 2370/157; B60K 2370/166; B60K 2370/741; B60K 28/02

See application file for complete search history.

(56) References Cited

U.S. PATENT DOCUMENTS

| | | | |
|---|---|---|---|
| 10,459,504 B2* | 10/2019 | Veloso | G06F 3/04842 |
| 2015/0339928 A1* | 11/2015 | Ramanujam | G06Q 50/30 |
| | | | 701/23 |
| 2016/0321848 A1* | 11/2016 | Ricci | A61B 7/04 |
| 2017/0259820 A1 | 9/2017 | Takahashi | |
| 2017/0337849 A1 | 11/2017 | Matsumoto et al. | |
| 2019/0138003 A1* | 5/2019 | Ming | B60W 50/14 |
| 2020/0160709 A1* | 5/2020 | Ramot | G06Q 10/109 |

FOREIGN PATENT DOCUMENTS

| | | | | |
|---|---|---|---|---|
| JP | 2006-339810 | | 12/2006 | |
| JP | 2007-216711 A | | 8/2007 | |
| JP | 2008-070966 A | | 3/2008 | |
| JP | 2011-119990 A | | 6/2011 | |
| JP | 2012-098197 A | | 5/2012 | |
| JP | 2014179067 A | * | 9/2014 | ............ G10L 21/00 |
| JP | 2015-034777 A | | 2/2015 | |
| JP | 2016-125824 A | | 7/2016 | |
| JP | 2017-126193 A | | 7/2017 | |
| WO | WO 2016/038931 A1 | | 3/2016 | |

* cited by examiner

MOVING BODY OPERATION SUPPORT SYSTEM

CROSS-REFERENCE TO RELATED APPLICATIONS

This application is based upon and claims the benefit of priority from Japanese Patent Application No. 2017-163582, filed on Aug. 28, 2017; the entire contents of which are incorporated herein by reference.

FIELD

Embodiments described herein relate generally to a moving body operation support system.

BACKGROUND

Automatic driving technology is being developed for a moving body such as, for example, an automobile, etc. For example, a human (a passenger) that rides in a moving body having automatic driving provides operation instructions to the moving body by voice. It is desirable to enable more appropriate operations.

DETAILED DESCRIPTION

Figure 1:
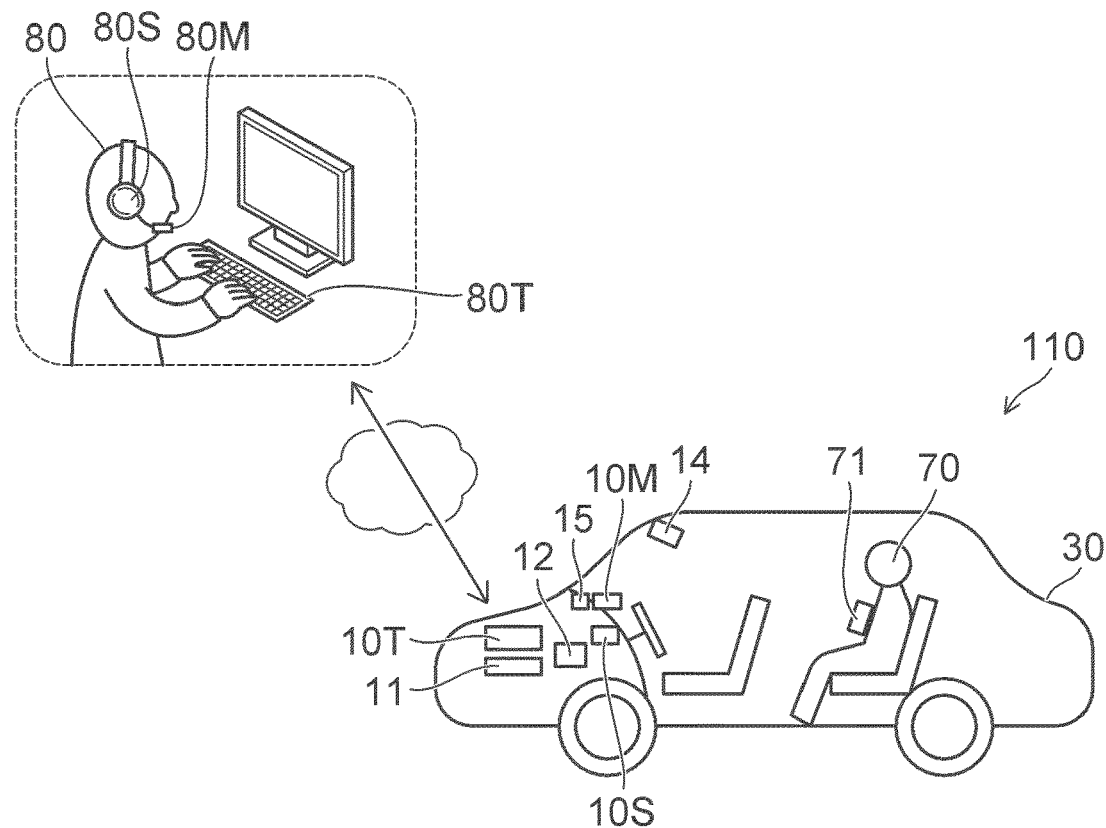
FIG. 1 is a schematic view illustrating a moving body operation support system according to an embodiment.

According to one embodiment, a moving body operation support system includes an acquirer, a microphone, a transceiver, and a processor. The acquirer is implemented in computer hardware and configured to acquire moving body information relating to a state of a moving body. The microphone is provided in the moving body. The transceiver is configured to communicate with an operator communication device used by an operator. A processor is configured to implement, based at least in part on the moving body information and instruction information one of a first operation or a second operation. The instruction information relates to an instruction obtained based at least in part on a sound acquired by the microphone. The instruction is received from a user riding in the moving body. In the first operation, the processor is configured to cause the moving body to perform a third operation corresponding to the instruction information. In the second operation, the processor is configured to enable communication between the user and the operator by causing communication between the transceiver and the operator communication device.

Various embodiments will be described hereinafter with reference to the accompanying drawings.

In the specification and drawings, components similar to those described or illustrated in a drawing thereinabove are marked with like reference numerals, and a detailed description is omitted as appropriate.

FIG. 1 is a schematic view illustrating a moving body operation support system according to an embodiment.

Figure 2:
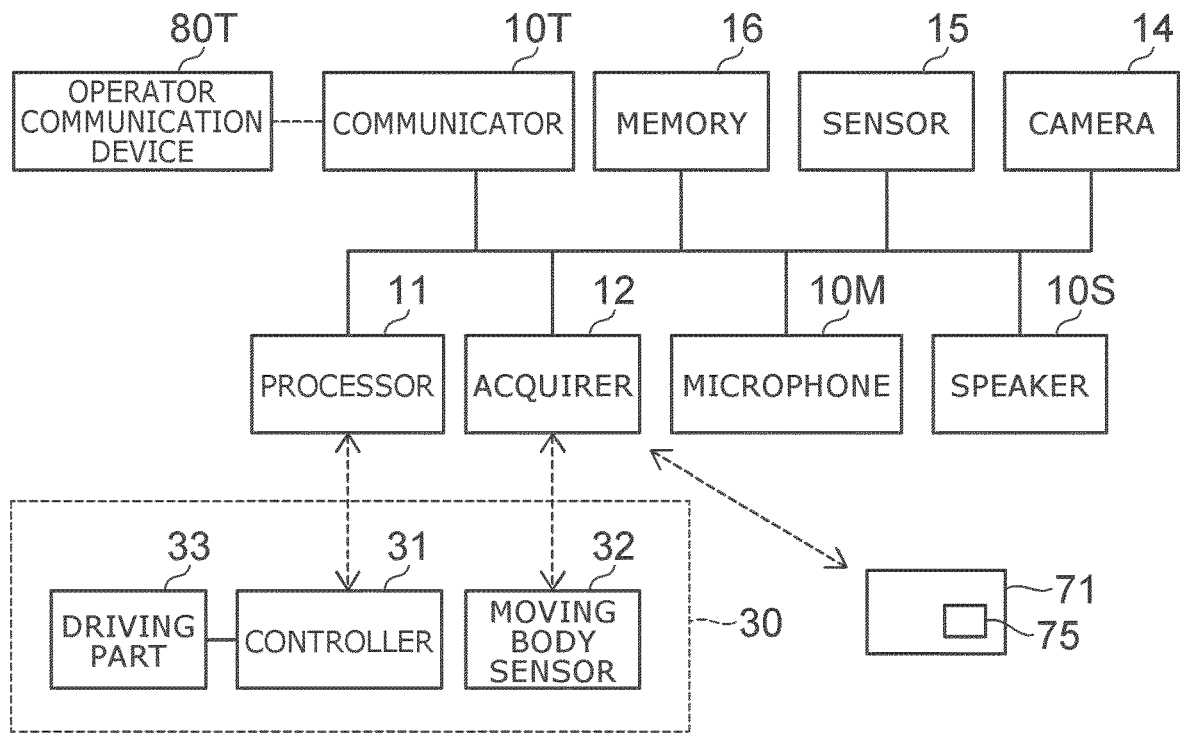
FIG. 2 is a block diagram illustrating the moving body operation support system according to the embodiment.

FIG. 2 is a block diagram illustrating the moving body operation support system according to the embodiment.

As shown in FIG. 1 and FIG. 2, the moving body operation support system 110 according to the embodiment includes an acquirer 12, a microphone 10M, a transceiver 10T, and a processor 11. In the example, the moving body operation support system 110 further includes a speaker 10S, a camera 14, and a sensor 15.

For example, the microphone 10M, the speaker 10S, the camera 14, and the sensor 15 are provided in a moving body 30.

The moving body 30 is, for example, a car. In such a case, the moving body 30 includes wheels. As described below, the moving body 30 may include a boat, an aircraft, etc.

It is possible for a user 70 to ride in the moving body 30. Automatic driving of the moving body 30 is possible. It may be possible for a human to operate the moving body 30. In the following example, the user 70 rides in the moving body 30; and the moving body 30 automatically drives. The moving body 30 transports the user 70 to the destination desired by the user 70.

For example, the microphone 10M acquires sound. The sound includes the voice of the user 70. For example, the intention (e.g., the destination, etc.) of the user 70 can be understood by performing voice recognition of the voice of the user 70 acquired by the microphone 10M.

The speaker 10S produces sound. The sound includes, for example, a question for the user 70. The user 70 hears the sound (the question sound) including the question. The user 70 can respond to the question. The response is acquired by the microphone 10M; and the intention of the user 70 is understood further.

For example, the camera 14 can capture an image of the interior of the moving body 30. For example, the image of the user 70 can be acquired by the camera 14. The state of the user 70 can be estimated from the image.

The acquirer 12 can acquire moving body information relating to the state of the moving body 30 (e.g., the current position of the moving body 30, the speed of the moving body 30, etc.). The moving body information may be acquired by a sensor (a moving body sensor 32 referring to FIG. 2) provided in the moving body 30. The acquirer 12 may acquire the moving body information acquired by the moving body sensor 32. Or, the moving body information may be acquired by the sensor 15. The acquirer 12 may acquire the moving body information acquired by the sensor 15.

Memory 16 (referring to FIG. 2) may be provided in the moving body operation support system 110. The memory 16 can store a program relating to at least a portion of the operations implemented by the moving body operation support system 110 (e.g., the processor 11). The memory 16 can store at least a portion of data used by the operations implemented by the moving body operation support system 110 (e.g., the processor 11).

For example, the moving body 30 can be controlled by an operator 80. The operator 80 may remotely operate the moving body 30. For example, the destination of the moving body 30, etc., may be set by, for example, the operator 80. The operator 80 controls the moving body 30 via, for example, an operator communication device 80T. For example, the operator 80 has an operator microphone 80M and an operator speaker 80S. For example, the operator 80 can use the operator speaker 80S to hear the sound acquired by the microphone 10M of the moving body 30. For example, it is possible for the operator 80 to talk to the user 70 by using the speaker 10S of the moving body 30.

Thus, other than the control of the moving body 30, the operator 80 can communicate with the user 70 (including a conversation, etc.). For example, the communication is performed by using the operator communication device 80T and the transceiver 10T.

The transceiver 10T of the moving body operation support system 110 can transmit to and receive from the operator communication device 80T used by the operator 80.

The processor 11 of the moving body operation support system 110 can implement a first operation and a second operation. These operations are switched based on the moving body information and the instruction of the user 70. For example, the instruction information relating to the instruction (e.g., the destination, etc.) of the user 70 riding in the moving body 30 can be derived based on the sound acquired by the microphone 10M. For example, the derivation is performed by voice recognition, etc. On the other hand, the moving body information recited above (e.g., the current position of the moving body 30, the speed of the moving body 30, etc.) is acquired by the acquirer 12.

Based on the instruction information and the moving body information, the processor 11 implements one of the first operation or the second operation. In the first operation, the processor 11 causes the moving body 30 to perform an operation corresponding to the instruction information. On the other hand, in the second operation, the processor 11 enables communication between the user 70 and the operator 80 by transmitting and receiving between the transceiver 10T and the operator communication device 80T.

For example, the first operation is performed in the case where the instruction of the user 70 is matched to the current condition of the moving body 30, and there is no problem when the moving body 30 is operated according to the instruction of the user 70. On the other hand, for example, there are cases where the instruction of the user 70 is unclear. Or, there are cases where the instruction of the user 70 is not matched to the current condition of the moving body 30, and it is dangerous to operate the moving body 30 according to the instruction of the user 70. In such a case, the processor 11 implements the second operation and does not implement the first operation. Thereby, the appropriate operation of the moving body 30 can be supported.

For example, a signal that is output from the processor is supplied to a controller 31 of the moving body 30 (referring to FIG. 2). The controller 31 controls a driving part 33. The moving body 30 is operated by the operation of the driving part 33. Thereby, for example, the first operation recited above is implemented.

On the other hand, in the second operation, the processor 11 enables communication between the user 70 and the operator 80. For example, the processor 11 notifies the operator 80 by using the communication between the transceiver 10T and the operator communication device 80T. The processor 11 prompts the operator 80 to communicate with the user 70. The processor 11 may provide, to the operator 80, the details of the occurrences up to this point including the voice of the user 70.

By the implementation of the second operation, the operator 80 can provide the service that is desired by the user 70 based on the communication with the user 70. For example, based on the conversation with the user 70, the operator 80 can set the destination desired by the user 70 in the moving body 30. For example, the operator 80 can explain the state of the moving body 30 to the user 70 and consult with the user 70. Based on the results, the operator 80 can control the operation of the moving body 30. For example, the operator 80 can transmit data to the controller 31 of the moving body 30 via the operator communication device 80T. Thereby, the operator 80 can control the operation of the moving body 30.

An example of the automatic driving implemented by the moving body 30 will now be described.

For example, the conditions of the surroundings of the moving body 30 are ascertained using the various sensors provided in the moving body 30, etc.; and the operation of the moving body 30 is performed without the operation of the user 70.

The setting of the destination, etc., also is performed by the user 70 in such an automatic driving. For example, when starting the operation of the moving body 30, an instruction from the user 70 including the destination or the like is performed by, for example, the voice, etc. For example, the sound that includes the voice is acquired by the microphone 10M; voice recognition is performed; and the intention of the user 70 is understood. The operation of the moving body 30 is started according to the intention (e.g., the destination) of the user 70.

At this time, for example, a dangerous state or a problematic state may occur in a reference example in which the moving body 30 is operated based on only the instruction of the user 70. For example, there are cases where the destination of the voice instruction of the user 70 is abnormally distal to the current position. For example, there are cases where the name of the destination desired by the user 70 is not known accurately. In such a case, if the destination is set erroneously, the service that is suited to the user 70 cannot be provided. For example, the moving body 30 may be requested to stop abruptly by the user 70 while moving. In such a case, an accident may occur due to the sudden stop according to the request of the user 70. Such a request (the instruction of the user 70) is dangerous in the reference example in which the moving body 30 is operated based on only the instruction of the user 70.

Or, for example, when the destination of the instruction of the user 70 is reached, there are cases where the position that is reached is a position not desired by the user 70. Trouble occurs upon reaching the destination in the reference example in which the moving body 30 is operated based on only the instruction of the user 70. In such a case as well, the appropriate service cannot be provided to the user 70.

For example, even for such conditions, there is a possibility that a somewhat appropriate service can be provided to the user 70 if the technology of voice recognition and intention understanding (e.g., artificial intelligence technology) is good. However, there is a limit to the improvement of artificial intelligence technology; and as a result, it is difficult to practically provide the appropriate service to the user 70.

Conversely, in the embodiment, the automatic driving of the moving body 30 or the communication with the operator 80 is performed based on the movement information acquired by the acquirer 12 in addition to the instruction information of the user 70. By considering the current state relating to the moving body 30 (the moving body information), the occurrence of the dangerous state or the problematic state can be suppressed.

There are two operation states in the embodiment. In one operation state, the processor 11 of the moving body operation support system 110 determines the intention of the user 70; and the moving body 30 is operated based on the determination of the processor 11. In the other operation state, the operator 80 has a conversation with the user 70; the operator 80 determines the intention of the user 70; and the moving body 30 is operated based on the determination of the operator 80. According to the embodiment, a moving body operation support system can be provided in which the appropriate operation is possible.

According to the embodiment, for example, the first operation is implemented in the case where it is alright for the moving body 30 to be operated according to the instruction of the user 70 (e.g., when it is safe). For example, voice recognition of the voice of the user 70 is performed; the intention of the user 70 is understood; and the desired operation of the user 70 is implemented. The control of the operator 80 can be omitted; and it is convenient. On the other hand, the second operation is implemented in the case where it is problematic for the moving body 30 to be operated according to the instruction of the user 70 (e.g., when it is unsafe). For example, the operator 80 can control the moving body 30 by using the conversation between the operator 80 and the user 70. Thereby, the appropriate service can be provided to the user 70.

In the embodiment, the user 70 may hold a device 71 such as a mobile telephone, a smartphone, a portable personal computer, etc. (referring to FIG. 1 and FIG. 2). For example, a portion of the communication between the operator 80 and the user 70 may be performed via the device 71.

For example, a user sensor 75 may be provided in the device 71. The user sensor 75 can sense the state of the user 70. The state of the user 70 includes at least one of the position of the user 70, the speed of the movement of the user 70, or the biological state of the user 70. The user sensor 75 may include, for example, GPS. The user sensor 75 may include an acceleration sensor. The user sensor 75 may be able to sense at least a portion of the pulse, the body temperature, the blood pressure, the blood oxygen concentration, and the breath alcohol concentration.

For example, the device 71 and the moving body operation support system 110 may be able to communicate. At least a portion of the state of the moving body 30 (the position, the speed, etc., of the moving body 30) may be estimated from the information relating to the user 70 obtained by the user sensor 75 of the device 71. At least a portion of the moving body information may be acquired based on the output of the user sensor 75. One operation of the first operation or the second operation performed by the processor 11 may be performed based on the output of the user sensor 75.

In the embodiment, for example, the moving body information includes at least one of the speed of the moving body 30, the acceleration of the moving body 30, the travel direction of the moving body 30, the position of the moving body 30, or the remaining capacity of the drive source of the moving body 30. For example, the position of the moving body 30 is based on GPS information, etc. The drive source of the moving body 30 includes, for example, fuel. The fuel includes gasoline, diesel fuel, etc. The fuel may include hydrogen, etc. The drive source may include a fuel cell. The drive source may include a battery.

For example, one of the first operation or the second operation is performed based on the moving body information recited above and the instruction information recited above (the information relating to the instruction of the user 70).

For example, the processor 11 implements the first operation when it is determined that it is safe for the moving body 30 to implement the operation corresponding to the instruction information. On the other hand, the processor 11 implements the second operation when it is determined to be unsafe for the moving body 30 to implement the operation corresponding to the instruction information. For example, it may be unsafe (dangerous) for the moving body 30 to be operated according to the instruction information in the case where the moving body 30 is moving at high speed or in the case where the acceleration of the moving body 30 is large. When it is unsafe, the second operation is implemented; and the control is switched to the control by the operator 80.

For example, there are cases where the instruction information includes information relating to the destination of the operation. In such a case, the moving body information includes the current position of the moving body 30. The processor 11 performs the first operation when the distance between the current position and the destination is not more than a prescribed first distance. On the other hand, the processor 11 performs the second operation when the distance between the current position and the destination exceeds the first distance. The first distance may be preset in the moving body 30. The second operation is implemented when the destination of the instruction of the user 70 is abnormally distal.

Similarly, in the embodiment, there are cases where the instruction information includes the information relating to the destination of the operation. In such a case, the moving body information may include the current remaining capacity of the drive source of the moving body 30. The processor 11 performs the first operation when the current remaining capacity is more than the "estimated usage amount of the drive source" estimated to be consumed to reach the destination. On the other hand, the processor 11 performs the second operation when the current remaining capacity is not more than the estimated usage amount. For example, the second operation is performed in the case where it is estimated that the destination desired by the user 70 is distal and cannot be reached using the remaining capacity of the drive source of the moving body 30.

Similarly, in the embodiment, there are cases where the instruction information includes the information relating to the destination of the operation. In such a case, the moving body information may include the travel direction of the moving body 30. There are cases where the direction of the destination is much different from the current travel direction of the moving body 30. In such a case, the first operation and the second operation may be switched. For example, the processor 11 performs the first operation when the difference between the travel direction and the direction of the destination is not more than a threshold. On the other hand, the processor 11 performs the second operation when the difference exceeds the threshold recited above. For example, in the case where the direction of the destination is much different from the current travel direction of the moving body 30, etc., the communication between the operator 80 and the user 70 is started; and the intention of the user 70 can be confirmed by the operator 80.

Similarly, in the embodiment, there are cases where the instruction information includes the information relating to the destination of the operation. After the moving body 30 has moved to the destination, there are cases where the destination is different from the position intended by the user 70. In such a case, the first operation and the second operation may be switched. For example, the processor 11 implements the first operation and causes the moving body 30 to perform the operation corresponding to the instruction information; and the moving body 30 reaches the destination. At this time, there are cases where it is estimated that the intention of the user 70 is different from the destination. For example, it can be estimated that the intention of the user 70 is different from the destination by performing voice recognition of the voice of the user 70. In such a case, the processor 11 further implements the second operation. By the second operation, the operation that corresponds to the intention of the user 70 is implemented by the control of the operator 80 by using the communication between the operator 80 and the user 70.

In the embodiment, the moving body information includes at least one of the speed of the moving body 30 or the acceleration of the moving body 30. In such a case, the processor 11 performs the first operation when the at least one recited above is not more than a threshold. The threshold is, for example, the value at which safe operation is possible. The processor 11 performs the second operation when the at least one recited above exceeds the threshold. A safe operation can be performed.

The processor 11 may implement one of the first operation or the second operation further based on the information relating to the user 70 in addition to the moving body information and the instruction information relating to the instruction of the user 70. For example, the first operation and the second operation may be switched according to the age, the gender, the language, etc., of the user 70. For example, the second operation is performed in the case where the user 70 is a human not accustomed to automatic driving. Thereby, the user 70 can convey to the operator 80 a request about the operation by a conversation. For example, by using identification information (e.g., the name, the mobile telephone number, etc.) of the user 70, the application frequency of the implementation of the first operation may be set to be high in the case where the user 70 has previous experience with automatic driving.

For example, there are cases where the owner of the moving body 30 is the user 70 (or a family member of the user 70, etc.). The application frequency of the implementation of the first operation may be set to be high in such a case. On the other hand, there are cases where the moving body 30 is a taxi, etc. In such a case, the user 70 may or may not be accustomed to automatic driving. The degree of how much the user 70 is accustomed may be estimated based on the information relating to the user 70 (e.g., the age, the gender, the language, etc.). For example, such information relating to the user 70 may be derived from at least one of the voice of the user 70 acquired by the microphone 10M or the image of the user 70 captured by the camera 14.

The information relating to the user 70 may include the emotion information of the user 70. For example, it can be estimated that the user 70 is angry from the voice of the user 70, etc. In such a case, the second operation is performed. For example, it is possible to estimate the emotion information from at least a portion of the voice of the user 70 included in the sound acquired by the microphone 10M.

The information relating to the user 70 may include biological information (at least one of the pulse, the body temperature, the blood pressure, the blood oxygen concentration, or the breath alcohol concentration) of the user 70. The biological information of the user 70 can be acquired from at least one of a sensor provided in the moving body 30 or the user sensor 75 provided in the device 71 of the user 70. By switching the operation based on the biological information of the user 70, more appropriate service can be provided to the user 70.

In one example as described above, the moving body information is acquired by the moving body sensor 32 provided in the moving body 30 (referring to FIG. 2). In such a case, the acquirer 12 of the moving body operation support system 110 acquires the moving body information from the moving body sensor 32.

In another example, the moving body operation support system 110 may further include the sensor 15 (referring to FIG. 1 and FIG. 2). In such a case, the acquirer 12 acquires the moving body information from the sensor 15.

In another example, at least a portion of the moving body information may be acquired by the user sensor 75 provided in the device 71 possessed by the user 70. For example, GPS may be provided in the device 71. For example, an acceleration sensor, etc., may be provided in the device 71. In such a case, at least a portion of the moving body information may be acquired by the user sensor 75. In such a case, the acquirer 12 acquires the moving body information from the user sensor 75.

The moving body operation support system 110 may further include the speaker 10S provided in the moving body 30. The communication between the operator 80 and the user 70 is performed by the microphone 10M and the speaker 10S.

In the embodiment, at least a portion of the communication between the operator 80 and the user 70 may be performed by a portable terminal (the device 71) of the user 70.

An example of the operations implemented by the moving body operation support system 110 will now be described. In the following example, the moving body 30 is a taxi; and the user 70 is a customer of the taxi.

Figure 3:
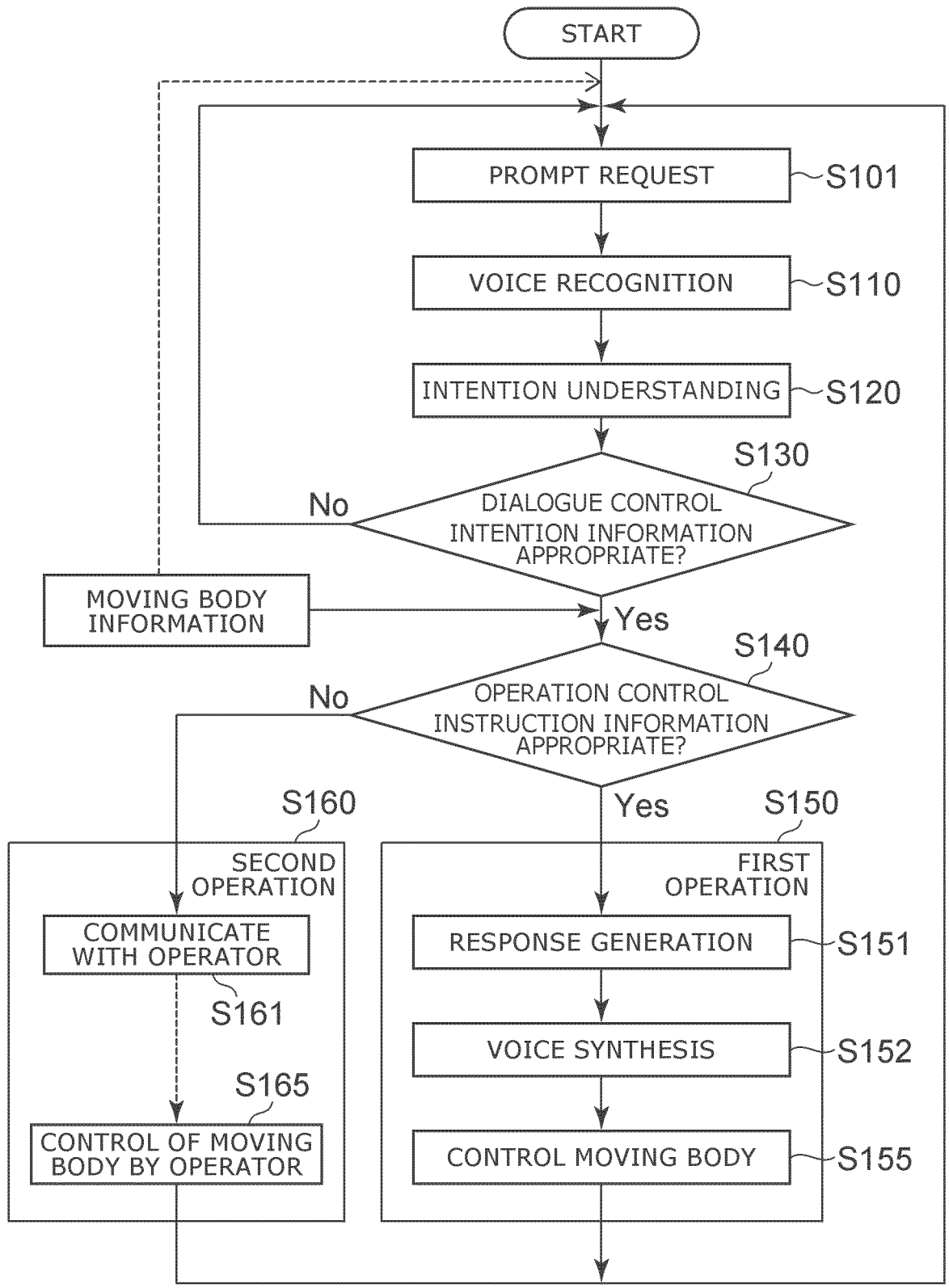
FIG. 3 is a flowchart illustrating the operations of the moving body operation support system according to the embodiment.

FIG. 3 is a flowchart illustrating the operations of the moving body operation support system according to the embodiment.

When the user 70 gets into the moving body 30, the moving body operation support system 110 questions the user 70. For example, a voice is emitted from the speaker 10S to ask "What is your destination?" or the like. Thus, the user 70 is prompted to provide a "service request" (step S101).

Conversely, a voice is emitted from the user 70. Voice recognition of the voice is performed (step S110). For example, the voice includes information relating to the designation of the destination. As described below, the instruction information that relates to the instruction of the user 70 is derived from the voice recognition data of the sound acquired by the microphone 10M.

In the moving body operation support system 110, intention understanding is performed from the result of the voice recognition (step S120). The intention information is extracted from the voice.

A dialogue control is performed (step S130). For example, it is determined whether or not the extracted intention information matches the condition. For example, there are cases where the intention information obtained by step S120 is not related to the destination. Or, there are cases where the intention information obtained by step S120 is unclear. In such a case (in the case where the intention information is inappropriate), response generation and voice synthesis are performed for re-confirming the destination; and the flow returns to step S101. On the other hand, in step S130, there are cases where the intention information obtained by step S120 relates to the destination and is clear. In such a case (in the case where the intention information is appropriate), the intention information is used as the instruction information relating to the instruction of the user 70. Then, the flow proceeds to the following step S140.

An operation control is implemented in step S140. In the operation control, one of the first operation or the second operation is selected based on the instruction information and the moving body information. For example, the flow proceeds to the first operation (step S150) in the case where it is alright to operate according to the instruction information (in the case where the instruction information is appropriate). On the other hand, the flow proceeds to the second operation (step S160) in the case where it is problematic to operate according to the instruction information (in the case where the instruction information is inappropriate).

The response generation (step S151) and the voice synthesis (step S152) are performed in step S150 (the first operation). For example, in the case where the intention information is appropriate and the destination is recognized as the instruction information, a response of "Is XXX your destination?" is generated; and the voice of this content is synthesized. The synthesized voice is emitted from the speaker 10S. The control of the moving body 30 (step S155) is performed if the consent of the user 70 is obtained. For example, a signal is supplied to the controller 31 of the moving body 30 from the processor 11 of the moving body operation support system 110. For example, the moving body 30 starts to move.

In step S160 (the second operation), communication with the operator 80 is performed (step S161). The operator 80 understands the request of the user 70 from the communication with the user 70. For example, the operator 80 can understand the destination. Based on the destination, the moving body 30 is controlled by the operator 80 (step S165). For example, the information that relates to the destination is supplied to the moving body 30 by the operator 80; and the moving body 30 starts to operate according to the information.

Thus, the appropriate operation is possible.

In the embodiment, the speaker 10S can emit a question sound including a question for the user 70 (referring to step S101, step S151, etc.). In such a case, the sound acquired by the microphone 10M includes the voice of the user 70 for the question sound recited above. In such a case, the instruction information is derived from the voice recognition data of the voice of the user 70 (referring to step S120, step S130, and step S140).

There are cases where there is no response from the user 70 for the question from the speaker 10S, the response is unclear, etc. In such cases, the question may be repeated. In other words, the emission of the question sound is multiply performed. There are cases where a response is not obtained even when the question is repeated. In such cases, the processor 11 performs the second operation after the emission of the question sound is performed multiple times.

Figure 4:
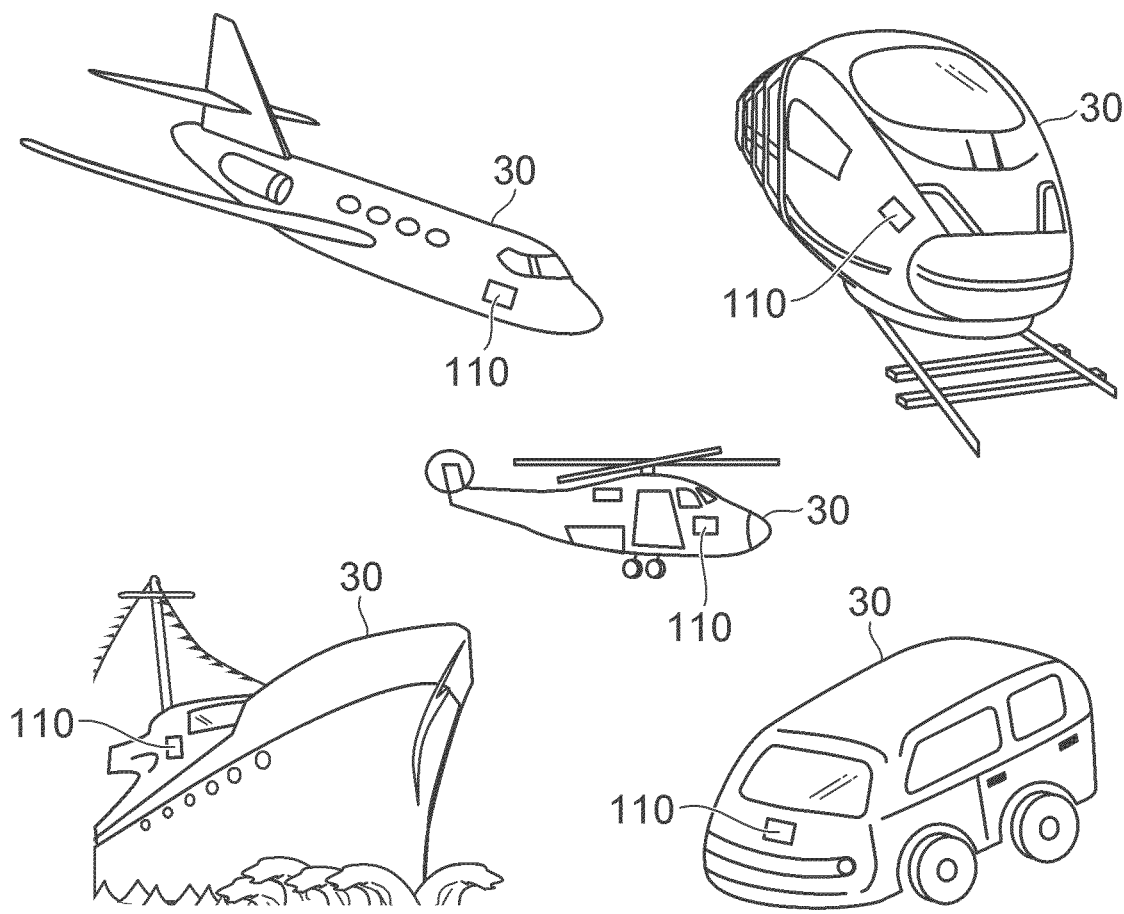
FIG. 4 is a schematic view showing usage examples of the moving body operation support system according to the embodiment.

FIG. 4 is a schematic view showing usage examples of the moving body operation support system according to the embodiment.

As shown in FIG. 4, the moving body 30 in which the moving body operation support system 110 according to the embodiment is used is, for example, at least one of a car (including a four-wheeled vehicle, a three-wheeled vehicle, a two-wheeled vehicle, etc.), a train, a ship, or an aircraft (including a helicopter).

In the case where the moving body 30 is a taxi, the operator 80 belongs to a taxi organization, etc. In the case where the moving body 30 is a rental car, the operator 80 belongs to a rental car organization, etc. In the case where the moving body 30 is a car owned by an individual, the operator 80 may belong to a car insurance organization, etc.

For example, in the embodiment, in the case where the moving body 30 is a taxi, when the customer (the user 70) voices a request, an automatic response or a response of the operator 80 is switched based on the content of the request and the sensor data of the taxi. For example, the operator 80 responds in the case where the request is important or urgent. For example, the burden of the operator 80 can be suppressed. The appropriate service is provided.

For example, it is difficult to handle all of the requests of the user 70 by only automatic response. For example, there are cases where it is difficult to determine the urgency using only the utterance of the user 70. On the other hand, the cost of response of the operator 80 is higher. According to the embodiment, for example, the appropriate service can be provided while suppressing the cost.

For example, in the case where the request is the setting of the destination, the operation (the first operation) of the automatic response is performed in the case where the speed of the moving body 30 is not more than a constant (e.g., zero). On the other hand, the operation (the second operation) of the response of the operator 80 is performed in the case where the speed of the moving body 30 is nonzero. Thereby, for example, the operator 80 can correspond appropriately to a sudden change after starting to move.

For example, in the case where the request is for the moving body 30 to stop, the automatic response (the first operation) is implemented if the moving body 30 can be stopped; and the moving body 30 stops. On the other hand, the response (the second operation) by the operator 80 is performed in the case where the moving body 30 is at a position where it cannot be stopped (e.g., an expressway, etc.).

For example, there are cases where there is no response of the user 70. In such a case, if the position of the moving body 30 is the destination, the automatic response (the first operation) is implemented; and the moving body 30 is stopped at the destination. In such a case, there is a possibility that the user 70 is asleep; and the user 70 is not woken. On the other hand, the response (the second operation) of the operator 80 is implemented if the position of the moving body 30 is the destination and the stopped time of the moving body 30 has exceeded a constant. For example, the condition of the user 70 is confirmed by the operator 80. The operator 80 prompts the user 70 to exit the vehicle as necessary.

For example, in the case where the request is the setting of the destination, the second operation is implemented if the destination is more distal than a prescribed distance (or, in the case where the fare is higher than a prescribed fare, or the predicted necessary time is longer than a prescribed predicted necessary time).

For example, the processor 11 may perform the first operation when a value relating to the current position and the destination is not more than the first value; and the processor 11 may perform the second operation when the value relating to the current position and the destination exceeds the first value. The value that relates to the current position and the destination recited above may include, for example, at least one of the distance between the current position and the destination, the cost (the fare) incurred between the current position and the destination, or the necessary time relating to the movement between the current position and the destination.

For example, there are cases where an error occurs in the navigator device provided in the moving body 30. For example, there are cases where the instruction of the destination of the user 70 is an error. For example, there are cases where there are multiple users 70; and the requests of the users cannot be understood. For example, there are cases where the request of the user cannot be understood due to noise, etc. For example, the intention understanding may fail. In such various states, the second operation is implemented after a prescribed amount of time has elapsed. More appropriate service can be provided.

According to the embodiments, a moving body operation support system can be provided in which the appropriate operation is possible.

Hereinabove, embodiments of the invention are described with reference to examples. However, the invention is not limited to these examples. For example, one skilled in the art may similarly practice the invention by appropriately selecting specific configurations of components included in the moving body operation support system such as the processor, the acquirer, the microphone, the speaker, the sensor, the camera, the memory, the operator communication device, etc., from known art; and such practice is within the scope of the invention to the extent that similar effects can be obtained.

Two or more components of any of the examples may be combined within the extent of technical feasibility and are within the scope of the invention to the extent that the spirit of the invention is included.

All moving body operation support systems practicable by an appropriate design modification by one skilled in the art based on the moving body operation support systems described above as embodiments of the invention also are within the scope of the invention to the extent that the spirit of the invention is included.

Various modifications and alterations within the spirit of the invention will be readily apparent to those skilled in the art; and all such modifications and alterations should be seen as being within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A moving body operation support system, comprising:
an acquirer implemented in computer hardware and configured to acquire moving body information relating to a state of a moving body;
a microphone provided in the moving body;
a transceiver configured to communicate with an operator communication device used by an operator; and
a processor configured to implement, based at least in part on the moving body information and an instruction information, one of a first operation or a second operation, wherein the instruction information relates to an instruction obtained based at least in part on a sound acquired by the microphone and wherein the instruction is received from a user riding in the moving body,
wherein in the first operation, the processor is configured to cause the moving body to perform a third operation corresponding to the instruction information,
wherein in the second operation, the processor is configured to enable communication between the user and the operator by causing communication between the transceiver and the operator communication device,
the moving body information comprises at least one of a speed of the moving body or an acceleration of the moving body,
the instruction information comprises a request to stop the moving body,
the processor performs the first operation when the at least one of the speed of the moving body or the acceleration of the moving body is less than or equal to a threshold, and
the processor performs the second operation when the at least one of the speed of the moving body or the acceleration of the moving body exceeds the threshold.

2. The system according to claim 1, wherein the moving body information comprises at least one of a speed of the moving body, an acceleration of the moving body, a travel direction of the moving body, a position of the moving body, or a remaining capacity of a drive source of the moving body.

3. The system according to claim 1, wherein
the instruction information comprises information relating to a destination of the operation,
the moving body information comprises a current position of the moving body,
the processor performs the first operation when a value relating to the current position and the destination is less than or equal to a first value,
the processor performs the second operation when the value relating to the current position and the destination exceeds the first value, and
the value relating to the current position and the destination comprises at least one of:
a distance between the current position and the destination,
a cost occurring between the current position and the destination, or
an amount of time relating to movement between the current position and the destination.

4. The system according to claim 1, wherein
the instruction information comprises information relating to a destination of the operation,
the moving body information comprises a current remaining capacity of a drive source of the moving body,
the processor performs the first operation when the current remaining capacity is more than a usage amount of the drive source, wherein the usage amount is estimated to be consumed to reach the destination, and
the processor performs the second operation when the current remaining capacity is less than or equal to the estimated usage amount.

5. The system according to claim 1, wherein
the moving body information comprises at least one of a speed of the moving body or an acceleration of the moving body,
the processor performs the first operation when the at least one is less than or equal to a threshold, and
the processor performs the second operation when the at least one exceeds the threshold.

6. The system according to claim 1, wherein
the instruction information comprises information relating to a destination of the operation,
the moving body information comprises a travel direction of the moving body,
the processor performs the first operation when a difference between the travel direction and a direction of the destination is less than or equal to a threshold, and
the processor performs the second operation when the difference exceeds the threshold.

7. The system according to claim 1, wherein
the instruction information comprises information relating to a destination of the operation, and the processor implements the first operation and causes the moving body to perform the third operation corresponding to the instruction information, and when the moving body reaches the destination, the processor further implements the second operation when it is estimated that an input destination input by the user in response to a question sound produced by a speaker is different from the destination by performing voice recognition of the voice of the user.

8. The system according to claim 1, wherein the processor implements the one of the first operation or the second operation further based on information relating to the user.

9. The system according to claim 8, wherein the information relating to the user comprises emotion information of the user.

10. The system according to claim 9, wherein the emotion information is estimated from at least a portion of a voice of the user included in the sound acquired by the microphone.

11. The system according to claim 8, wherein the information relating to the user comprises biological information of the user.

12. The system according to claim 1, wherein
the moving body information is acquired by a moving body sensor provided in the moving body, and
the acquirer acquires the moving body information from the moving body sensor.

13. The system according to claim 1, further comprising a sensor, the acquirer is configured to acquire the moving body information from the sensor.

14. The system according to claim 1, wherein
at least a portion of the moving body information is acquired by a user sensor provided in a device possessed by the user, and
the acquirer acquires the moving body information from the user sensor.

15. The system according to claim 1, further comprising a speaker provided in the moving body, the communication is performed by the microphone and the speaker.

16. The system according to claim 15, wherein
the speaker emits a question sound comprising a question for the user,
the sound acquired by the microphone includes a voice of the user for the question sound, and
the instruction information is derived from voice recognition data of the voice of the user.

17. The system according to claim 16, wherein the processor performs the second operation after the emitting of the question sound is performed multiple times.

18. The system according to claim 1, wherein the instruction information is derived from voice recognition data of the sound acquired by the microphone.

19. The system according to claim 1, wherein at least a portion of the communication is performed by a portable terminal of the user.

* * * * *